United States Patent
Lewis et al.

(10) Patent No.: US 6,493,730 B1
(45) Date of Patent: Dec. 10, 2002

(54) EFFICIENT OBJECT FAULTING WITH GENERATIONAL GARBAGE COLLECTION

(75) Inventors: Brian T. Lewis, Palo Alto, CA (US); Bernd J. W. Mathiske, Santa Clara, CA (US); Antonios Printczis, Glasgow (GB); Malcolm P. Atkinson, Helensburgh (GB)

(73) Assignee: Sun Microsystems, Inc., Santa Clara, CA (US)

( * ) Notice: Subject to any disclaimer, the term of this patent is extended or adjusted under 35 U.S.C. 154(b) by 256 days.

(21) Appl. No.: 09/686,164

(22) Filed: Oct. 10, 2000

(51) Int. Cl.$^7$ ................................................ G06F 17/30
(52) U.S. Cl. ...................................................... 707/206
(58) Field of Search ........................... 707/1, 2, 4, 206, 707/10, 100, 101

(56) References Cited

U.S. PATENT DOCUMENTS 6,247,027 B1 * 6/2001 Chaudhry et al. .......... 707/100
6,339,782 B1 * 1/2002 Gerard et al. .................. 709/1
6,393,439 B1 * 5/2002 Houldsworth et al. ...... 707/206

* cited by examiner

Primary Examiner—Diane D. Mizrahi
Assistant Examiner—Yicun Wu
(74) Attorney, Agent, or Firm—Edward J. Grundler; Park, Vaughan & Fleming LLP

(57) ABSTRACT

One embodiment of the present invention provides a system for allocating storage space for objects within a persistent object system. The persistent object system includes an object heap that is organized into a young generation region and an old generation region. The system uses the young generation region for newly created objects and uses the old generation region for objects that have not been removed by several garbage collection cycles. The system allocates storage space for new (transient) objects in the young generation region of the object heap. Periodically, the system copies the transient objects from the object heap to a stable store to form a checkpoint of the system state. Transient objects become persistent objects when they are copied to the stable store. Persistent objects are removed from the object heap when the system is stopped and when room is needed in the object heap for additional objects. When a persistent object that has been removed is referenced during execution of a computer program, the system faults the persistent object directly into the old generation region of the object heap from the stable store.

24 Claims, 3 Drawing Sheets

EFFICIENT OBJECT FAULTING WITH GENERATIONAL GARBAGE COLLECTION

BACKGROUND

1. Field of the Invention

The present invention relates to allocating storage space for objects within a persistent object system. More specifically, the present invention relates to allocating storage space for persistent objects within the heap of a persistent object system that uses a generational garbage collector.

2. Related Art

Many modern computing devices, for example web servers, execute computer programs that are designed to run for long periods of time. It is advantageous for these computing devices to have a persistent object system that allows faster recovery when the computer program is stopped and restarted. A computer program can be stopped and restarted for a number of reasons. For example, the computing device may need maintenance, the power may fail, or a program executing on the computing device may fail.

A persistent object system provides the illusion of a very large object heap that is automatically backed by stable storage. During operation of a persistent object system, objects are automatically saved to stable storage, typically on a disk, and fetched from stable storage into virtual memory on demand.

Persistent object systems automatically perform atomic writes to stable storage in order to ensure that a program's data will survive intact even if the program crashes. Hence, persistent programs (programs using a persistent object system) do not have to reinitialize the state of their objects when they restart. This reduces application startup time and eliminates the need for code to recreate and reinitialize objects.

To make persistent programs as fast as possible, object faulting must be efficient. This means that object heap allocation must be efficient. This is especially true for persistent programs as these programs often fault-in millions of objects. During object faulting space is allocated for an object in the program's garbage collected object heap, and the persistent object is copied into the allocated space from the stable store.

Many high-performance garbage-collected object heap implementations are generational. They take advantage of the fact that most objects have a short lifetime and segregate objects into two or more regions of the object heap called generations. In a two generation object heap implementation, these can be termed a young generation region and an old generation region. New objects are allocated to the young generation region, which is garbage collected frequently to reclaim the storage of short-lived objects. Long-lived objects that survive several young generation garbage collections are promoted (moved) to the old generation region.

Faulting persistent objects into the young generation can make garbage collection, especially young generation garbage collection, much more time-consuming than garbage collection of non-persistent systems. Objects faulted-in by a persistent object system tend to have longer lifetimes than newly allocated transient (non-persistent) objects. Hence, when a faulted-in object is allocated in the young generation region, it usually ends up being promoted to the old generation region after several young generation region garbage collections creating needless work for the young generation garbage collector.

References from the old generation region to the young generation region are normally rare but are common in persistent object systems where persistent objects are faulted-in to the young generation region. The young region garbage collectors must do substantial work for the persistent objects faulted-in to the young generation region because object heap implementations store references from the old generation region to the young generation region in data structures that are designed to save space rather than for fast processing.

If the rate at which persistent objects are faulted-in is high, the young generation region is mostly filled with long-lived persistent objects. This causes the rate of the young region garbage collections to increase. Also, each of the young region garbage collections will reclaim only a small number of objects. Furthermore, each young region garbage collection will typically be much more expensive because of the cost of processing a large number of references from the old generation region to the young generation region as explained above.

Hence, faulting persistent objects to the young generation region of the object heap is inefficient.

What is needed is a persistent object system that eliminates the above-described disadvantages of faulting a persistent object into a young generation region of an object heap.

SUMMARY

One embodiment of the present invention provides a system for allocating storage space for objects within a persistent object system. The persistent object system includes an object heap that is organized into a young generation region and an old generation region. The system uses the young generation region to store newly created objects and uses the old generation region to store objects that have not been removed by several garbage collection cycles. The system allocates storage space for new (transient) objects in the young generation region of the object heap. Periodically, the system copies the transient objects from the object heap to a stable store to form a checkpoint of the system state. Transient objects become persistent objects when they are copied to the stable store. Persistent objects are removed from the object heap when the system is stopped and when room is needed in the object heap for additional objects. When a persistent object that has been removed from memory is referenced during execution of a computer program, the system faults the persistent object directly into the old generation region of the object heap from the stable store.

In one embodiment of the present invention, the object heap is located in a virtual memory of the persistent object system.

In one embodiment of the present invention, the object heap can include regions for generations other than the young generation region and the old generation region.

In one embodiment of the present invention, transient objects are newly created objects.

In one embodiment of the present invention, the generational garbage collector reclaims unreferenced objects. In doing so, the generational garbage collector first deletes objects that are no longer referenced from the object heap. Next, the generational garbage collector reallocates storage space formerly used by the deleted objects within the object heap. Finally, the generational garbage collector promotes transient objects from the young generation region of the object heap to the old generation region of the object heap if the transient object is not deleted by the generational garbage collector after a user configurable number of garbage collections.

In one embodiment of the present invention, the system copies transient objects to the stable store in order to generate a checkpoint of a state of the computer program.

In one embodiment of the present invention, the persistent object is removed from the object heap because the persistent object system required more space within the object heap, the persistent object system was shut-down or stopped because of a hardware or software error; or the persistent object system was subject to a system crash or power failure.

In one embodiment of the present invention, the system faults persistent objects directly into the old generation region of the object heap by allocating space in the old generation region of the object heap, and then copying the persistent object from the stable store to the old generation region of the object heap.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
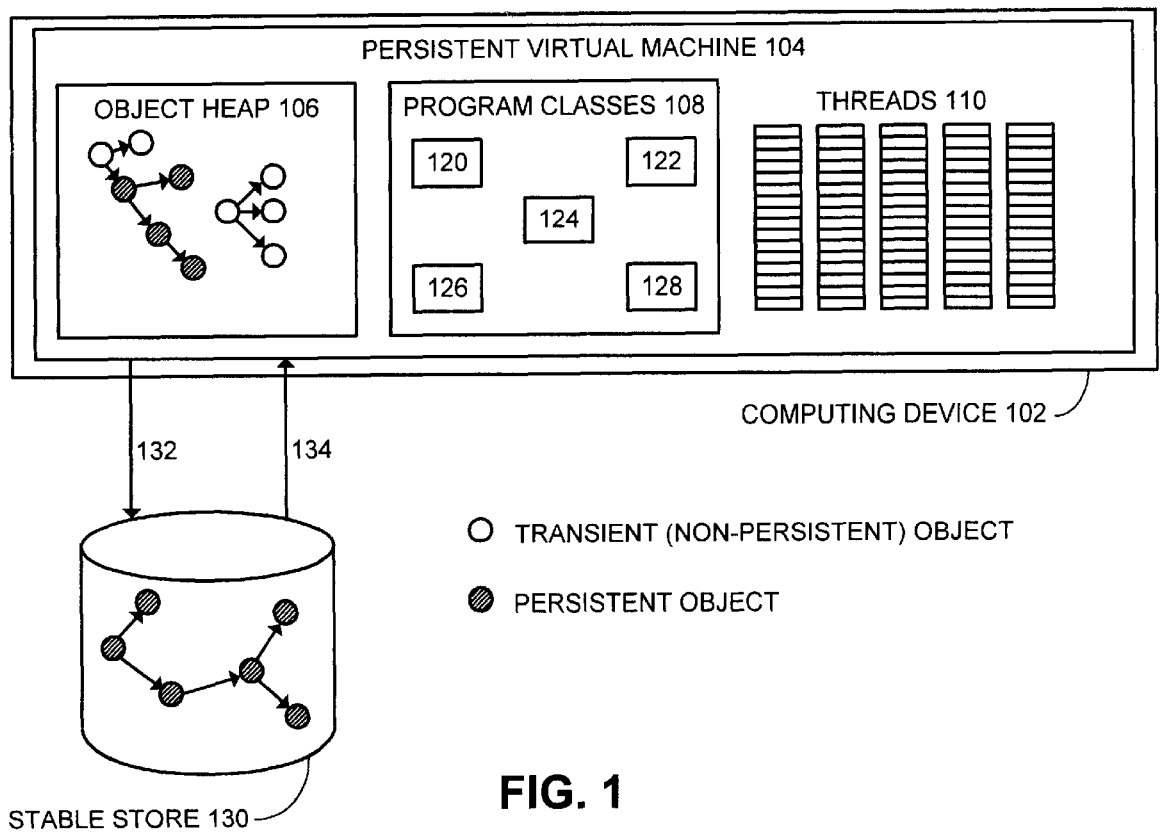
FIG. 1 illustrates a computing device including a persistent virtual machine in accordance with an embodiment of the present invention.

FIG. 1 illustrates computing device 102 including persistent virtual machine 104 in accordance with an embodiment of the present invention. Computing device 102 may include any type of computer system, including, but not limited to, a computer system based on a microprocessor, a mainframe computer, a digital signal processor, a personal organizer, a device controller, and a computational engine within an appliance.

Computing device 102 uses persistent virtual machine 104 to process code produced by compilers of languages such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.)

The code resides within classes in program classes 108. Classes 120, 122, 124, 126, and 128 represent some of these classes in program classes 108. Threads 110 represent the current processes that are being executed by persistent virtual machine 104. For example, one thread can be a generational garbage collector while another thread can be a user application.

Persistent virtual machine 104 uses object heap 106 to store objects. In general, object heap 106 includes two types of objects, transient (non-persistent) objects and persistent objects. In FIG. 1, open circles represent transient objects and cross-hatched circles represent persistent objects; arrows represent links between the various objects.

New objects in object heap 106 are created as transient objects. At some point in time, persistent virtual machine 104 copies the transient objects across link 132 to stable store 130. As the transient objects are copied to stable store 130, the objects are marked as persistent objects. Copying objects to stable store 130 creates a checkpoint of the state of object heap 106 at the time the objects were copied.

Persistent objects may be removed from object heap 106 as desired and later recovered from stable store 130 across link 134. Persistent objects may be removed from object heap 106 for a number of reasons, including: because room is needed for other objects; because computing device 102 was shut-down or stopped because of a hardware or software error; or because computing device 102 was subject to a power failure.

Stable store 130 can include any type of non-volatile storage device that can be coupled to a computer system. This includes, but is not limited to, magnetic, optical, and magneto-optical storage devices, as well as storage devices based on flash memory and/or battery-backed up memory.

Object Heap

Figure 2:
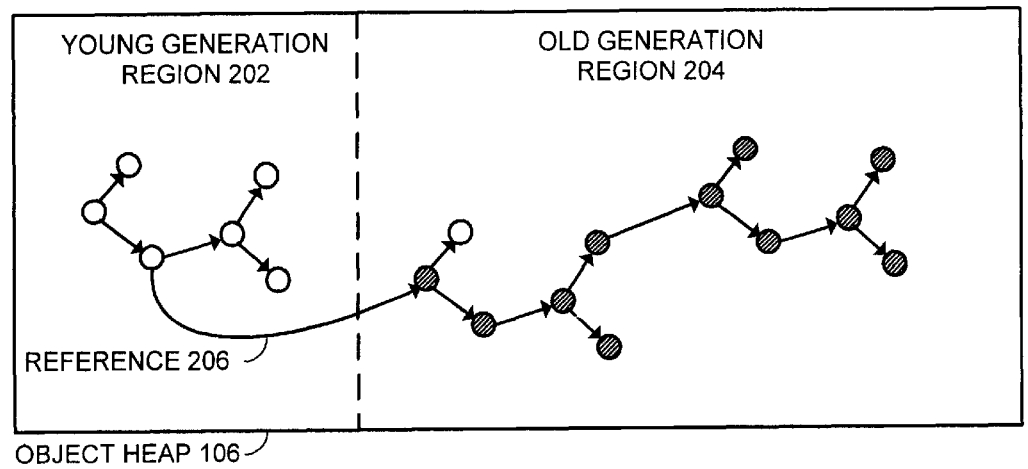
FIG. 2 illustrates an object heap including a young generation region and an old generation region in accordance with an embodiment of the present invention.

FIG. 2 illustrates object heap 106 including young generation region 202 and old generation region 204 in accordance with an embodiment of the present invention. Regions 202 and 204 contain several objects. Some of these objects are transient while some of the objects are persistent.

Also illustrated in FIG. 2 is reference 206, which links an object in young generation region 202 to an object in old generation region 204. Persistent virtual machine 104 uses a generational garbage collector that is optimized for the direction of references such as reference 206. Hence, references from an object in old generation region 204 to an object in young generation region 202 are rare, and, when encountered, take an excessive amount of time for the generational garbage collector to process.

Object Header

Figure 3:
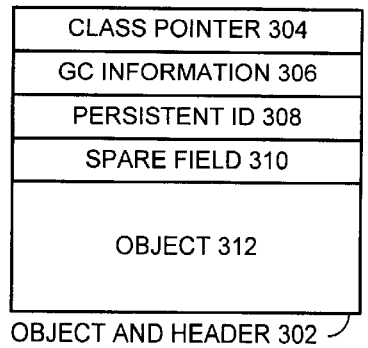
FIG. 3 illustrates an object and header in accordance with an embodiment of the present invention.

FIG. 3 illustrates an object and header 302 in accordance with an embodiment of the present invention. Object and header 302 includes, but is not limited to, class pointer 304, GC information 306, persistent ID 308, spare field 310, and object 312.

Class pointer 304 references the associated class in program classes 108. GC information 306 is used by the generational garbage collector during garbage collection cycles to aid in performing the garbage collection.

Persistent ID 308 is the persistent identifier and indicates if the object is transient or persistent. A value of zero in persistent ID 308 indicates a transient object. A value of one in the low order bit of persistent ID 308 indicates that the object is persistent.

Creating an Object

Figure 4:
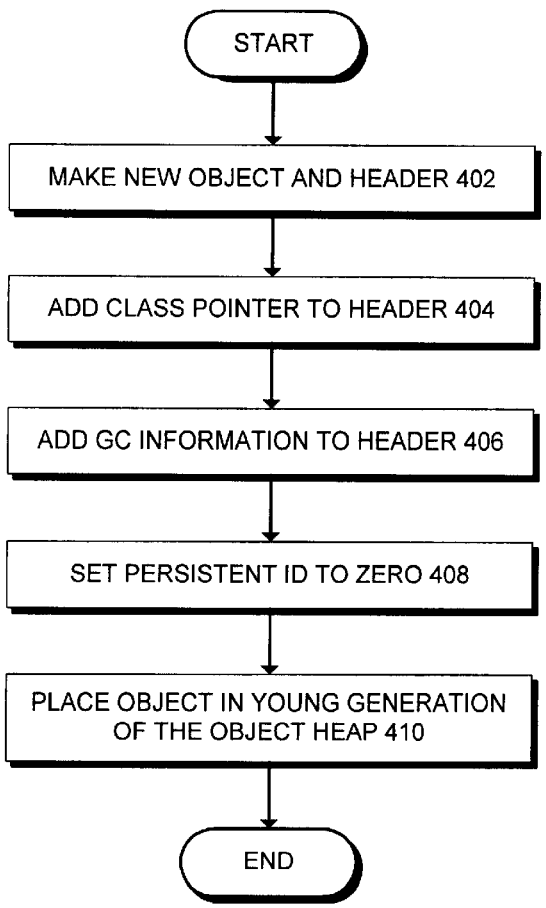
FIG. 4 is a flowchart illustrating the process of creating a new object in accordance with an embodiment of the present invention.

FIG. 4 is a flowchart illustrating the process of creating a new object in accordance with an embodiment of the present invention. The system starts when persistent virtual machine 104 creates a new object and associated header (step 402). Next, persistent virtual machine 104 adds the class pointer to class pointer 304 (step 404).

Persistent virtual machine 104 then initializes GC information 306 for use by the generational garbage collector (step 406). Next, persistent ID 308 is set to zero (step 408).

Finally, the object is placed in young generation region 202 of object heap 106 (step 410).

Creating a Persistent Object

Figure 5:
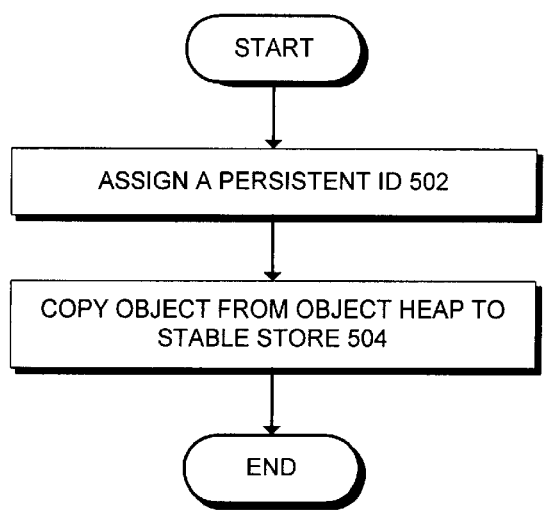
FIG. 5 is a flowchart illustrating the process of creating a persistent object in accordance with an embodiment of the present invention.

FIG. 5 is a flowchart illustrating the process of creating a persistent object in accordance with an embodiment of the present invention. The system starts when persistent virtual machine 104 assigns a persistent ID to an object (step 502). Persistent virtual machine 104 then copies the object from object heap 106 to stable store 130 across link 132 (step 504).

Accessing an Object

Figure 6:
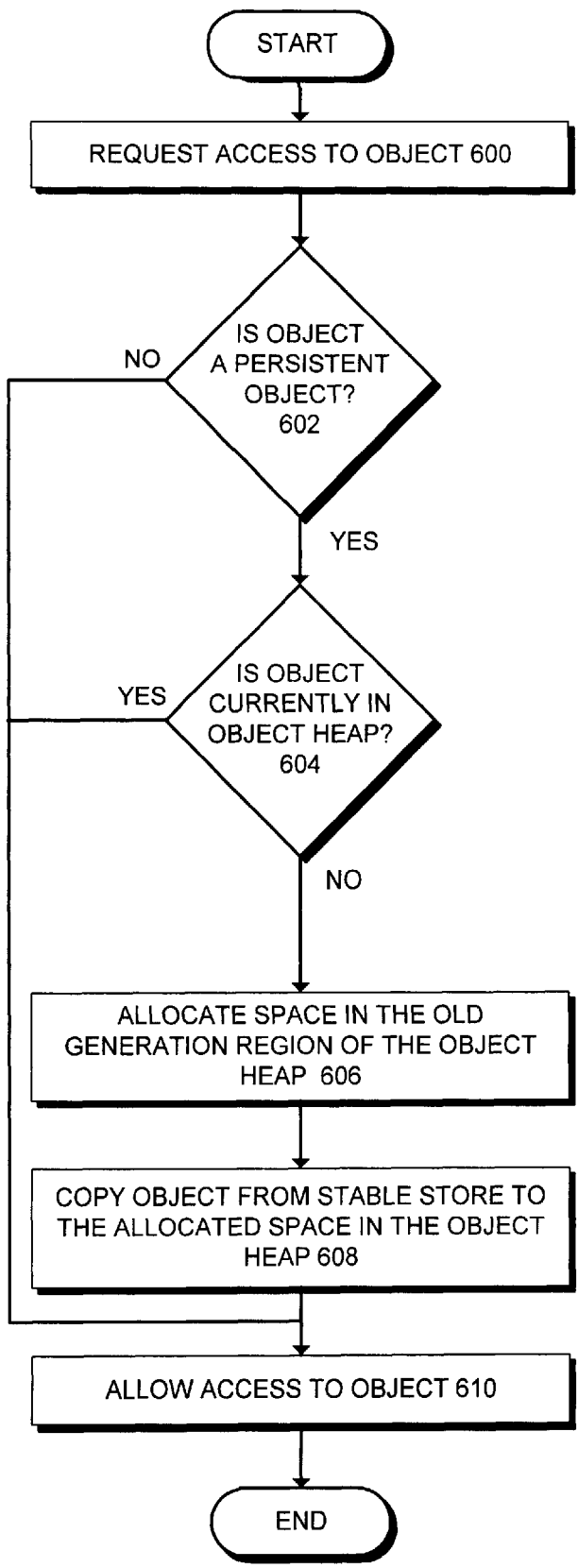
FIG. 6 is a flowchart illustrating the process of gaining access to an object in accordance with an embodiment of the present invention.

FIG. 6 is a flowchart illustrating the process of gaining access to an object in accordance with an embodiment of the present invention. The system starts when persistent virtual machine 104 requests access to an object (step 600).

Next, persistent virtual machine 104 determines if the object is a persistent object by examining persistent ID 308 (step 602). If the object is a persistent object (step 602), persistent virtual machine 104 determines if the object is currently in object heap 106 (step 604).

If the object is not currently in object heap 106, persistent virtual machine 104 allocates space in old generation region 204 of the object heap (step 606). Note that if persistent virtual machine 104 allocated space in young generation region 202, it would be possible to generate many object references from old generation region 204 to young generation region 202. The present invention avoids this type of reference, and hence saves time because the young garbage collector does not need to follow references for which it is not optimized.

Next, persistent virtual machine 104 copies the persistent object from stable store 130 to object heap 106 across link 134 (step 608).

Finally, if the object is not a persistent object (step 602), if the persistent object is currently in object heap 106 (step 604), or after the persistent object is copied from stable store 130 to object heap 106 across link 134 (step 608), persistent virtual machine 104 allows access to the object (step 610).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for allocating storage space for objects within a persistent object system, the persistent object system including an object heap, wherein the object heap is organized into a young generation region and an old generation region, wherein the young generation region is used for newly created objects and the old generation region is used for objects that have not been removed by several garbage collection cycles, the method comprising:
    allocating storage space for a transient object in the young generation region of the object heap;
    allowing a generational garbage collector to reclaim unreferenced objects from the object heap;
    copying the transient object from the object heap to a stable store, so that the transient object becomes a persistent object;
    removing the persistent object from the object heap; and
    when the removed persistent object is referenced during execution of a computer program, faulting the persistent object directly into the old generation region of the object heap.

2. The method of claim 1, wherein the object heap is located in a virtual memory of the persistent object system.

3. The method of claim 1, wherein the object heap can include regions for generations other than the young generation region and the old generation region.

4. The method of claim 1, wherein the transient object is a newly created object.

5. The method of claim 1, wherein allowing the generational garbage collector to reclaim unreferenced objects involves:
    deleting objects that are no longer referenced from the object heap;
    reallocating storage space formerly used by the deleted objects within the object heap; and
    promoting the transient object from the young generation region of the object heap to the old generation region of the object heap if the transient object is not deleted by the generational garbage collector.

6. The method of claim 1, wherein the transient object is copied to the stable store in order to generate a checkpoint of a state of the computer program.

7. The method of claim 1, wherein the persistent object is removed from the object heap because, one of:
    the persistent object system required more space within the object heap;
    the persistent object system was shut-down and restarted; and
    the persistent object system was subject to a power failure.

8. The method of claim 1, wherein faulting the persistent object directly into the old generation region of the object heap involves:
    allocating space in the old generation region of the object heap; and copying the persistent object from the stable store to the old generation region of the object heap.

9. A computer-readable storage medium storing instructions that when executed by a computer causes the computer to perform a method for allocating storage space for objects within a persistent object system, the persistent object system including an object heap, wherein the object heap is organized into a young generation region and an old generation region, wherein the young generation region is used for newly created objects and the old generation region is used for objects that have not been removed by several garbage collection cycles, the method comprising:

allocating storage space for a transient object in the young generation region of the object heap;

allowing a generational garbage collector to reclaim unreferenced objects from the object heap;

copying the transient object from the object heap to a stable store, so that the transient object becomes a persistent object;

removing the persistent object from the object heap; and when the removed persistent object is referenced during execution of a computer program, faulting the persistent object directly into the old generation region of the object heap.

10. The computer-readable storage medium of claim 9, wherein the object heap is located in a virtual memory of the persistent object system.

11. The computer-readable storage medium of claim 9, wherein the object heap can include regions for generations other than the young generation region and the old generation region.

12. The computer-readable storage medium of claim 9, wherein the transient object is a newly created object.

13. The computer-readable storage medium of claim 9, wherein allowing the generational garbage collector to reclaim unreferenced objects involves:

deleting objects that are no longer referenced from the object heap;

reallocating storage space formerly used by the deleted objects within the object heap; and promoting the transient object from the young generation region of the object heap to the old generation region of the object heap if the transient object is not deleted by the generational garbage collector.

14. The computer-readable storage medium of claim 9, wherein the transient object is copied to the stable store in order to generate a checkpoint of a state of the computer program.

15. The computer-readable storage medium of claim 9, wherein the persistent object is removed from the object heap because, one of:

the persistent object system required more space within the object heap;

the persistent object system was shut-down and restarted; and the persistent object system was subject to a power failure.

16. The computer-readable storage medium of claim 9, wherein faulting the persistent object directly into the old generation region of the object heap involves:

allocating space in the old generation region of the object heap; and copying the persistent object from the stable store to the old generation region of the object heap.

17. An apparatus that facilitates allocating storage space for objects within a persistent object system, the persistent object system including an object heap, wherein the object heap is organized into a young generation region and an old generation region, wherein the young generation region is used for newly created objects and the old generation region is used for objects that have not been removed by several garbage collection cycles, comprising:

an allocating mechanism that is configured to allocate storage space for a transient object in a young generation region of the object heap;

a generational garbage collector mechanism that is configured to delete objects that are no longer needed from the object heap;

a copying mechanism that is configured to copy the transient object from the old generation region of the object heap to a stable store, so that the transient object becomes a persistent object;

a removing mechanism that is configured to remove the persistent object from the object heap; and a faulting mechanism that is configured to fault the persistent object directly into the old generation region of the object heap.

18. The apparatus of claim 17, wherein the object heap is located in a virtual memory of the persistent object system.

19. The apparatus of claim 17, wherein the object heap can include regions for generations other than the young generation region and the old generation region.

20. The apparatus of claim 17, wherein the transient object is a newly created object.

21. The apparatus of claim 17, wherein the generational garbage collector comprises:

a deleting mechanism that is configured to delete objects that are no longer referenced from the object heap;

a reallocating mechanism that is configured to reallocate storage space formerly used by the deleted objects within the object heap; and a promoting mechanism that is configured to promote the transient object from the young generation region of the object heap to the old generation region of the object heap.

22. The apparatus of claim 17, wherein the transient object is copied to the stable store in order to generate a checkpoint of a state of the computer program.

23. The apparatus of claim 17, wherein the persistent object is removed from the object heap because, one of:

the persistent object system required more space within the object heap;

the persistent object system was shut-down and restarted; and the persistent object system was subject to a power failure.

24. The apparatus of claim 17, wherein the faulting mechanism further comprises:

an allocating mechanism that is configured to allocate space in the old generation region of the object heap; and a copying mechanism that is configured to copy the persistent object from the stable store to the old generation region of the object heap.

* * * * *

UNITED STATES PATENT AND TRADEMARK OFFICE
CERTIFICATE OF CORRECTION

PATENT NO. : 6,493,730 B1
APPLICATION NO. : 09/686164
DATED : December 10, 2002
INVENTOR(S) : Brian T. Lewis et al.

It is certified that error appears in the above-identified patent and that said Letters Patent is hereby corrected as shown below:

On the title page item (75), delete the last name, "Printczis" and replace with the last name --Printezis--.

Signed and Sealed this

Twentieth Day of February, 2007

JON W. DUDAS
*Director of the United States Patent and Trademark Office*